Patented Nov. 3, 1953

2,658,071

UNITED STATES PATENT OFFICE 2,658,071

PENTACHLOROPHENYL ESTER OF TRICHLOROACETIC ACID

Floyd L. Beman, Midland, Mich., assignor to The Dow Chemical Company, Midland, Mich., a corporation of Delaware No Drawing. Application November 23, 1951, Serial No. 257,930

1 Claim. (Cl. 260—479)

The present invention is directed to the pentachlorophenyl ester of trichloroacetic acid of the formula

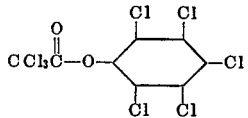

This compound is a crystalline solid somewhat soluble in many organic solvents and substantially insoluble in water. It is adapted to be employed for the sterilization of soil, the regulation of plant growth and as an intermediate for the preparation of more complex organic derivatives.

The new compound may be prepared by reacting together a molecular proportion of (1) sodium pentachlorophenate and at least a molecular proportion of (2) trichloroacetyl chloride of the formula

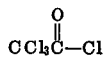

The reaction is carried out in an organic solvent such as acetone.

In carrying out the reaction, the trichloroacetyl chloride is added portionwise with stirring to the sodium pentachlorophenate dissolved in acetone and at a temperature of from 20° to 60° C. The reaction is somewhat exothermic and takes place smoothly at the temperature range of from 20° to 60° C. The temperature may be controlled by regulation of the rate of contacting the reactants, as well as by the addition and subtraction of heat, if required. In practice, it is oftentimes convenient to operate at the boiling temperature of the reaction mixture and under reflux. Following the reaction, the reaction mixture is diluted with water, the desired product precipitating as a crystalline solid. The latter may be further purified by crystallization from organic solvents.

In a representative preparation, 2 grams (0.017 mole) of trichloroacetyl chloride was slowly added portionwise to 3 grams (0.01 mole) of anhydrous sodium pentachlorophenate dissolved in 11 grams of acetone. The addition was carried out with stirring and at a temperature of 50° C. Following the reaction, the crude mixture was diluted with 15 milliliters of cold water, the desired pentachlorophenyl trichloroacetate product precipitating as a crystalline solid. The latter was separated by filtration and dried. The dried product was thereafter recrystallized three times from cyclohexane and found to have a melting point of 130° to 130.5° C.

I claim:

The pentachlorophenyl ester of trichloroacetic acid.

FLOYD L. BEMAN.

References Cited in the file of this patent

UNITED STATES PATENTS

| Number | Name | Date |
|---|---|---|
| 2,508,334 | Moyle | May 16, 1950 |